(12) United States Patent
Fujinami et al.

(10) Patent No.: US 7,054,694 B2
(45) Date of Patent: May 30, 2006

(54) PROCESS CONTROL SYSTEM

(75) Inventors: Shingo Fujinami, Musashino (JP); You Funaki, Musashino (JP); Satoshi Okada, Musashino (JP); Takafumi Kawano, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 336 days.

(21) Appl. No.: 10/135,372

(22) Filed: May 1, 2002

(65) Prior Publication Data

US 2004/0015244 A1    Jan. 22, 2004

(30) Foreign Application Priority Data

| May 30, 2001 | (JP) | ............................. 2001-162093 |
| Jul. 17, 2001 | (JP) | ............................. 2001-216533 |
| Jul. 17, 2001 | (JP) | ............................. 2001-216534 |

(51) Int. Cl.
*G05B 13/02* (2006.01)

(52) U.S. Cl. ............................. 700/29; 700/28; 700/40; 700/103

(58) Field of Classification Search .................. 700/28, 700/54, 40, 103, 29; 364/51
See application file for complete search history.

(56) References Cited

U.S. PATENT DOCUMENTS

| 5,687,077 A | * | 11/1997 | Gough, Jr. ..................... 700/29 |
| 5,841,656 A | * | 11/1998 | Taruishi ........................ 700/86 |
| 6,017,143 A | * | 1/2000 | Eryurek et al. ................ 700/51 |
| 6,047,220 A | * | 4/2000 | Eryurek ........................ 700/28 |
| 6,119,047 A | * | 9/2000 | Eryurek et al. ................ 700/28 |
| 6,249,711 B1 | * | 6/2001 | Aart .............................. 700/19 |
| 6,397,114 B1 | * | 5/2002 | Eryurek et al. ................ 700/51 |
| 6,532,392 B1 | * | 3/2003 | Eryurek et al. ................ 700/54 |
| 6,539,267 B1 | * | 3/2003 | Eryurek et al. ................ 700/51 |
| 6,668,200 B1 | * | 12/2003 | Yasui et al. ................... 700/28 |
| 6,680,812 B1 | * | 1/2004 | Iwashiro ................... 360/78.06 |
| 2003/0009240 A1 | * | 1/2003 | Yasui et al. ................... 700/40 |
| 2003/0028264 A1 | * | 2/2003 | Yasui et al. ................... 700/29 |
| 2003/0139826 A1 | * | 7/2003 | Yasui et al. ................... 700/31 |

FOREIGN PATENT DOCUMENTS

| JP | 63-179648 | 7/1988 |
| JP | 2-1680 | 1/1990 |
| JP | 9-91071 | 4/1997 |
| JP | 2000-3329 | 1/2000 |

OTHER PUBLICATIONS

R.W. Lewis, 1999-1999, ABT control system, IEC61131-3 Programming Standard.*

* cited by examiner

*Primary Examiner*—Anthony Knight
*Assistant Examiner*—Sunray Chang
(74) *Attorney, Agent, or Firm*—Westerman, Hattori, Daniels & Adrian, LLP.

(57) ABSTRACT

The present invention has the following characteristics.

The process input signal input value and engineering unit value scale data are associated and stored inside the control unit. The operation value determined from the input value and the engineering unit value scale data are sent from the control unit to the monitoring unit. Accordingly, the control unit and monitoring unit do not hold separate engineering unit value scale data, so the engineering unit value scale data can be centrally managed.

12 Claims, 7 Drawing Sheets

PROCESS CONTROL SYSTEM

BACKGROUND OF THE INVENTION

1. Field of Invention

The present invention pertains to a process control system wherein the control engine is a soft PLC (Programmable Logic Controller), in particular a soft PLC written in a programming language based on the IEC 61131-3 standard.

2. Description of the Prior Art

Process control systems wherein a control logic, based on a soft PLC (Programmable Logic Controller) in which functions are defined by software, is used as the control application execution engine are often written in a programming language conforming to the IEC 61131-3 standard, in response to the demand for open systems. A soft PLC is a software model.

FIG. 1 is a function block diagram of a prior art example of a process control system in which a soft PLC is used as the control engine. A control unit 1 comprises an operation means 1a and data input means 1b for the operation means 1a.

An input output unit 2 receives an input signal (analog signal) related to physical unit values and the like from a process, then transmits the input value to the data input means 1b of the control unit 1 after A/D converting and normalizing it. An I/O bus 3 joins the control unit 1 and input output unit 2.

An operation and monitoring unit 4 has a human-machine interface function, and is joined with the control unit 1 by a control bus 5. The operation value of the operation means 1a is transmitted to a display means 4a, then converted to a physical unit value scale and displayed.

In the control unit 1 and operation and monitoring unit 4, the input value and operation value are provided as data in which the physical unit value span is normalized (0–100%). Therefore, operations and displaying require engineering unit value scale data for the physical unit value.

An engineering unit value scale data setting means 6 sets the engineering unit value scale data for the operation means 1a. An engineering unit value scale data setting means 7 sets the engineering unit value scale data for the display means 4a of the operation and monitoring unit.

Accordingly, the input of a conventional soft PLC is normalized data, so when engineering unit values are to be handled, engineering unit value scale data must be provided to both the operation means and display means and separately converted to physical unit value data.

In particular, in cases where the soft PLC is written in a programming language based on the IEC 61131-3 standard, parameters such as engineering unit value scale data used for the soft PLC must be defined by using external variables. In addition, it is necessary to set the engineering unit value scale data as external variables separately in the control unit 1 and operation and monitoring unit 4, which have independent hardware configurations utilizing a bus connection.

Therefore, if engineering unit value scale data are to be changed, it is necessary to change the engineering unit value scale data information input to both the operation means 1a and display means 4a. If the locations to be changed are not fully recognized due to a mistake, then there will be change omissions, and there will be a problem in that the operation value and display scale are incorrect.

The changing of both settings by an operator essentially involves a time lag, so in the transient state where the data has been changed for only one of them, there are likewise problems in which the operation value and display scale are incorrect.

SUMMARY OF THE INVENTION

The present invention has been created to solve the above-mentioned problems, and resides in realizing a process control system based on a soft PLC wherein the engineering unit value scale data are centrally managed to prevent change omissions, and it is possible to prevent errors in the operation value and display scale due to setting time lags.

DESCRIPTION OF THE PREFERRED EMBODIMENTS

The present invention will now be described in details using the drawings below.

(Embodiment 1)

Figure 1:
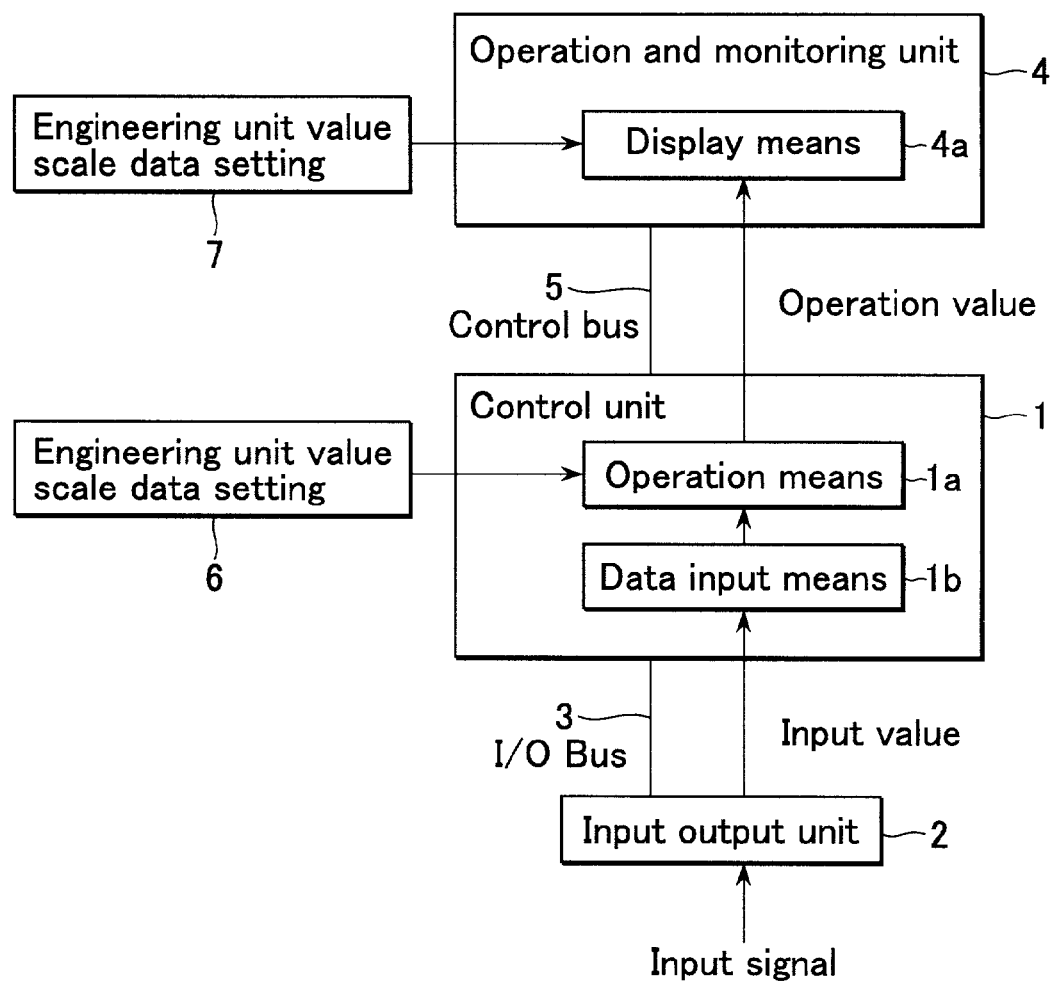
FIG. 1 is a function block diagram of a prior art example of a process control system.
Figure 2:
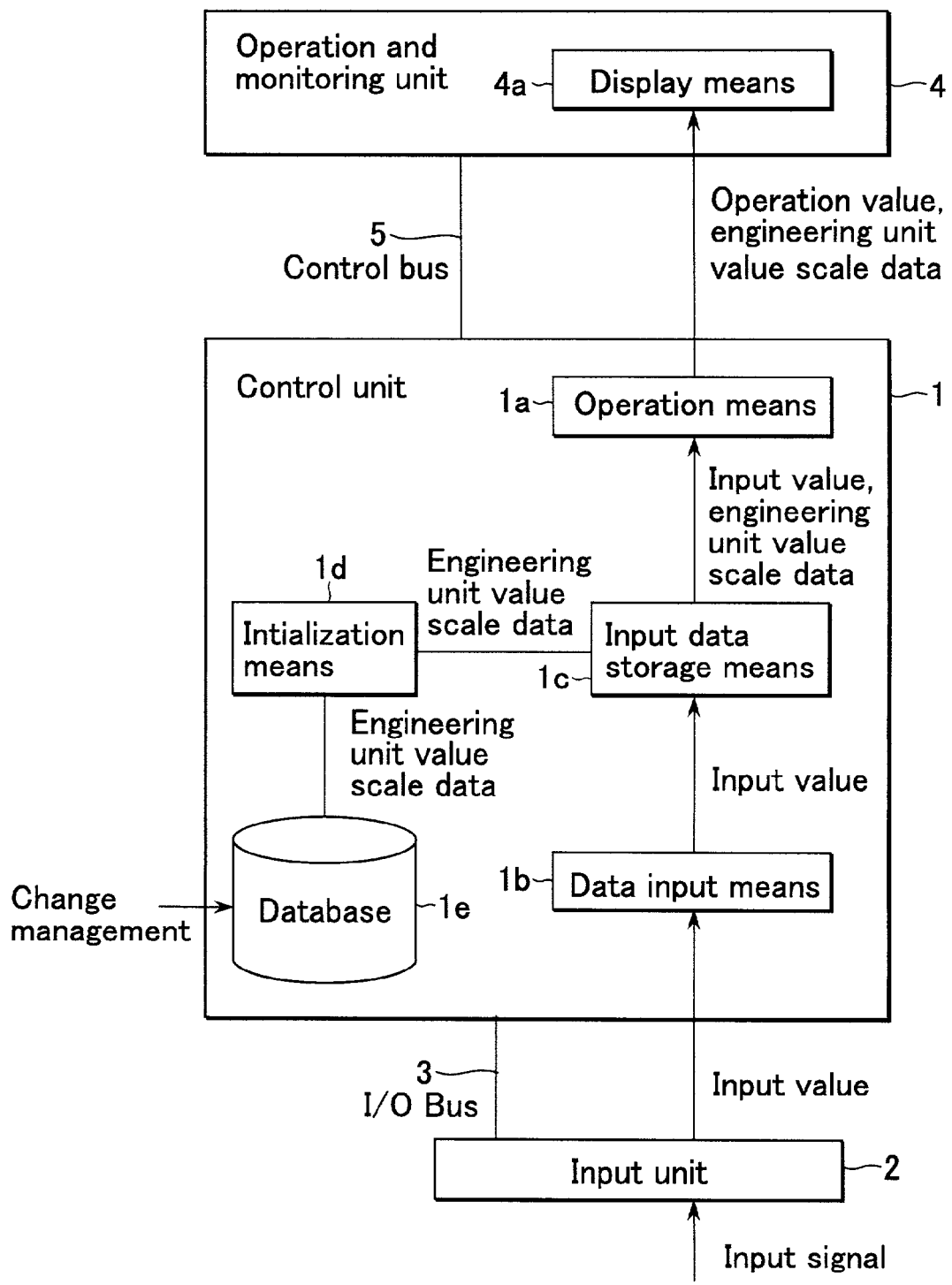
FIG. 2 is a function block diagram of Embodiment 1 of the present invention.

FIG. 2 is a function block diagram of Embodiment 1 of the present invention, wherein elements identical to those of the prior art example described for FIG. 1 are referenced alike and not described.

In the control unit 1, an input data storage means 1c is given an input value from the data input means 1b and engineering unit value scale data from initialization means 1d, where the input value and engineering unit value scale data are associated and then stored. The operation means 1a reads the structuralized input data (input value and engineering unit value scale data) from the input storage means 1c, converts them to engineering unit values, and performs computations upon them.

An initialization means 1d reads the engineering unit value scale data from a database 1e and sets them in the input data storage means 1c. The database 1e centrally manages the engineering unit value scale data required by the process control system.

Therefore, changes to the engineering unit value scale data are realized only through managing data changes in this database.

The display means 4a of the operation and monitoring unit 4 reads the structuralized operation data (operation value and engineering unit value scale data) from the operation means 1a via the control bus 5, converts them to a physical unit value scale, and displays them.

In the structure of the structuralized data, which is a characteristic of the present invention, a single data item is formed by a pair consisting of a normalized input value or operation value and engineering unit value scale data. Specifically, the normalized data and engineering unit value scale data are held in a pair of memory areas forming a single data item. Thus the input data storage means 1c is realized by a memory table means comprising multiple pairs of structuralized data.

Accordingly, the structural characteristics of the present invention reside in the fact that an input value and engineering unit value scale data are associated and stored in the input storage means 1c; and the fact that the operation means 1a and display means 4a do not separately hold the engineering unit value scale data, but are designed to reference them as part of structuralized data from a data reference source.

(Embodiment 2)

Figure 3:
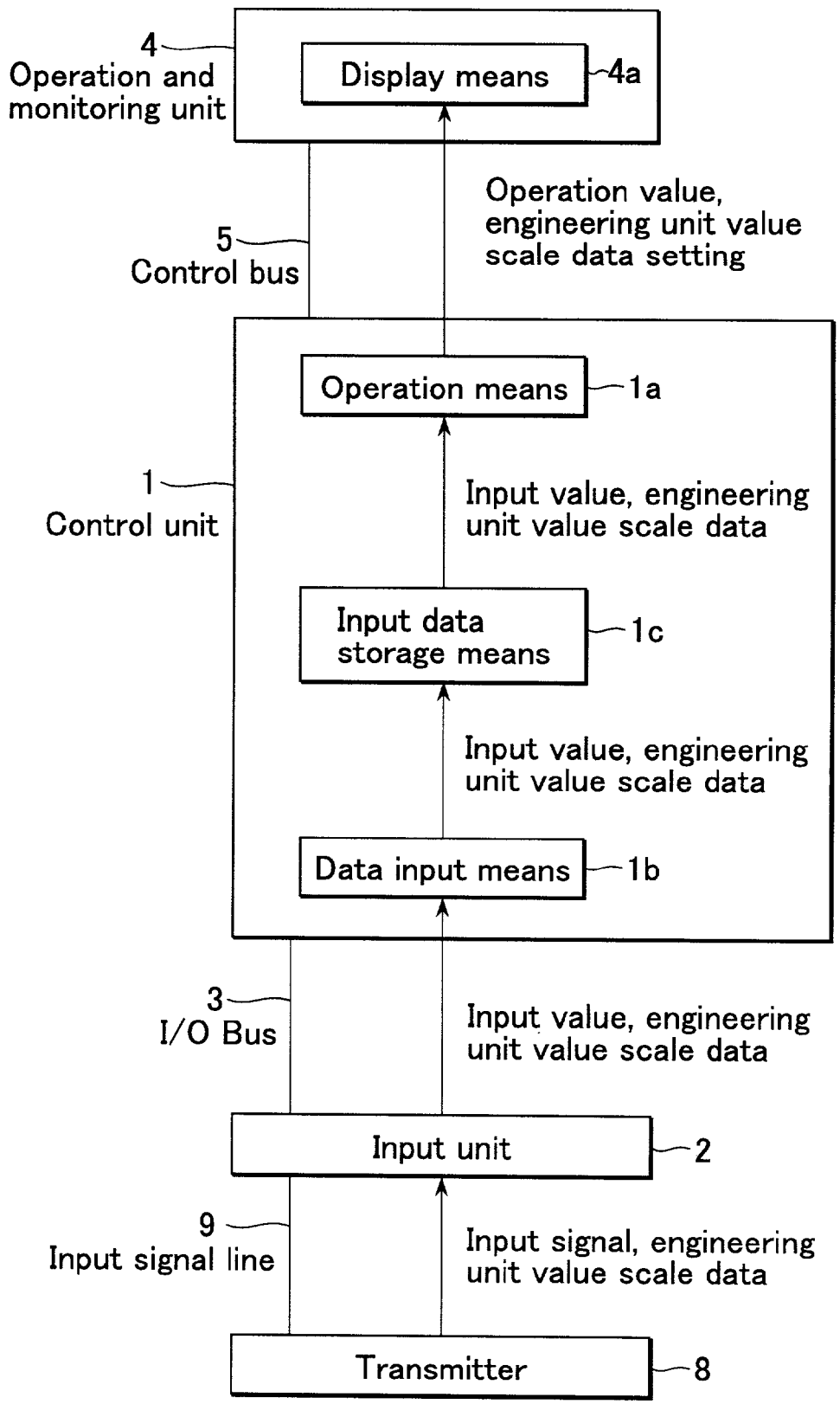
FIG. 3 is a function block diagram of Embodiment 2 of the present invention.

FIG. 3 is a function block diagram of Embodiment 2 of the present invention. It differs from FIG. 2 in the structure of a transmitter 8, which is connected via an input signal line 9 to an input unit 2.

In general, the transmitter uses engineering unit value scale information to normalize a measurement signal before outputting it. Therefore, this output contains engineering unit value scale information.

The transmitter 8 outputs an input signal and engineering unit value scale data as a structuralized signal via the input signal line 9. The input unit 2 generates structuralized input data (input value and engineering unit value scale data) by A/D converting the input signal.

The data input means 1b reads the structuralized input data (input value and engineering unit value scale data) from the input unit 2 via the I/O bus 3, and stores them in the input storage means 1c.

The operation means 1a reads the structuralized input data (input value and engineering unit value scale data) from the input data storage means 1c, converts them to an engineering unit value unit, and performs computations upon them. The display means 4a reads the structuralized operation data (operation value and engineering unit value scale data) from the operation means 1a via the control bus 5, converts them to a physical unit value scale and displays them.

In this embodiment, with respect to the engineering unit value scale data, it is sufficient to change only the settings of the transmitter 8 which transmits the measurement signal, without making any changes to the control unit 1 and operation and monitoring unit 4.

As is clear from the above description, with the present invention, an input data storage means, which associates and stores an input value and engineering unit value scale data in a control unit, is provided, making it possible to centrally manage the engineering unit value scale data required by the control unit's operation means and the operation and monitoring unit's display means.

Therefore, in managing changes to the engineering unit value scale data, the engineering unit value scale data can be replaced by the most recent data by changing only one location—the database in the control unit or the transmitter settings. This eliminates the problem of changing settings in multiple locations in prior art units.

(Embodiment 3)

Figure 4:
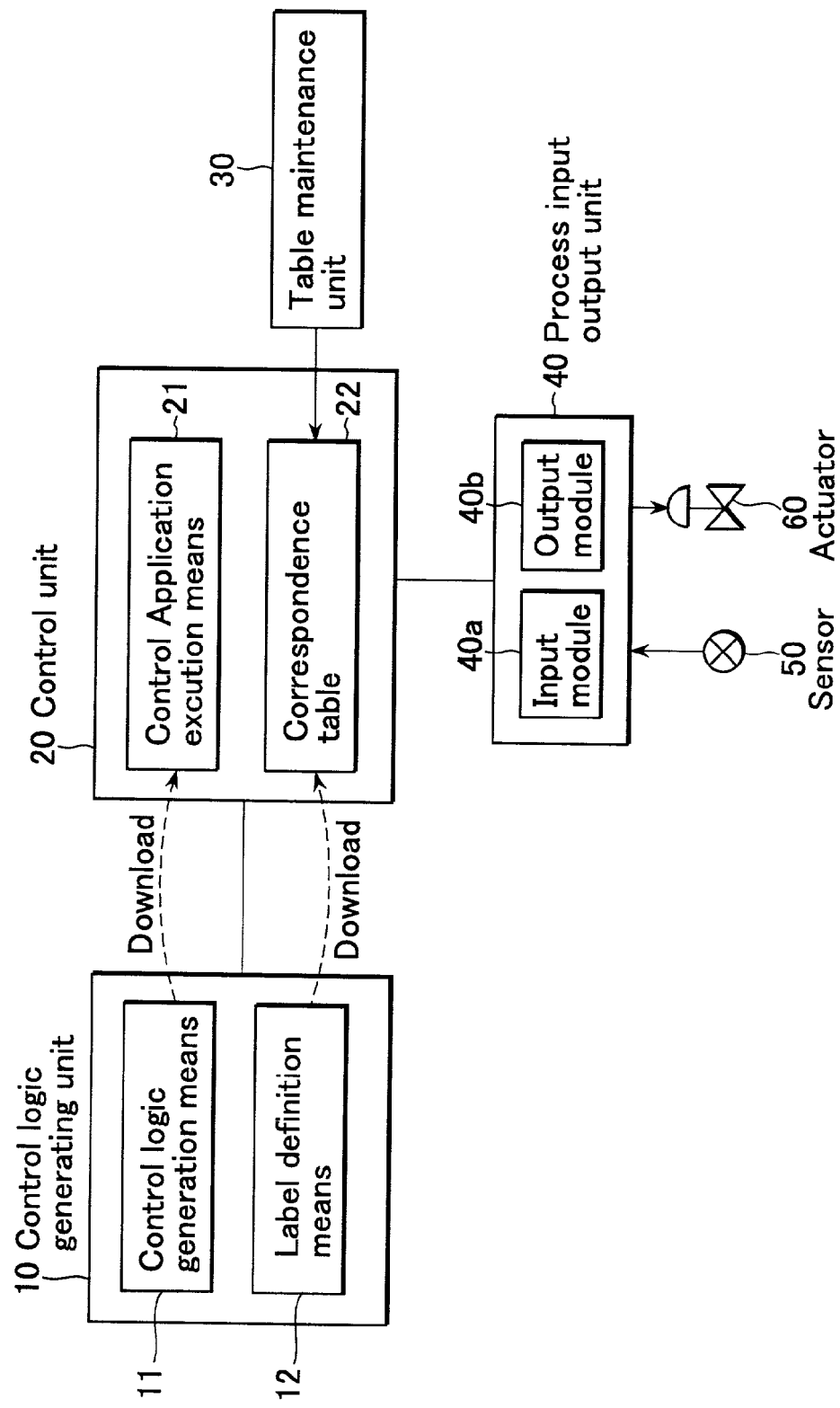
FIG. 4 is a function block diagram of Embodiment 3 of the present invention.

FIG. 4 is a function block diagram of Embodiment 3 of the present invention.

A control logic generating unit 10 is a unit that creates control applications to be run by a control unit 20. In general, it is realized by a general-purpose computer with a disk unit.

In the control logic generating unit 10, a control logic generation means 11 creates a control logic based on a soft PLC. A label definition means 12 defines variables handled by the control logic using label names. The data of these means are downloaded to the control unit 20. The control logic is used for control applications.

The control unit 20 is a unit that communicates with the real process' sensor and actuator, and executes process controls. In general, it runs on a dedicated computer.

A control application execution means 21 uses, as an execution engine, a soft PLC built from data downloaded from the control logic generation means 11.

In addition, in the control unit 20, a correspondence table 22 is built based on data downloaded from the label definition means 12. Mount position correspondences between the label names and the real process' I/O data are uniquely determined by the entries in the correspondence table 22.

A process input output unit 40 comprises multiple input modules 40a and multiple output modules 40b, which input and output data of the real process' sensor 50 and actuator 60.

Each of these modules is associated with a particular label name based on the definitions in the aforementioned correspondence table 22. The control application execution means 21 exchanges data with the real process via the input/output modules with the specified label, and executes controls.

A table maintenance unit 30 accesses the label-mount position correspondence table 22, which defines the label name and mount position correspondences, through an interface with the operator, and sets the correspondence relationships between the label names and mount positions as desired.

Figure 5:
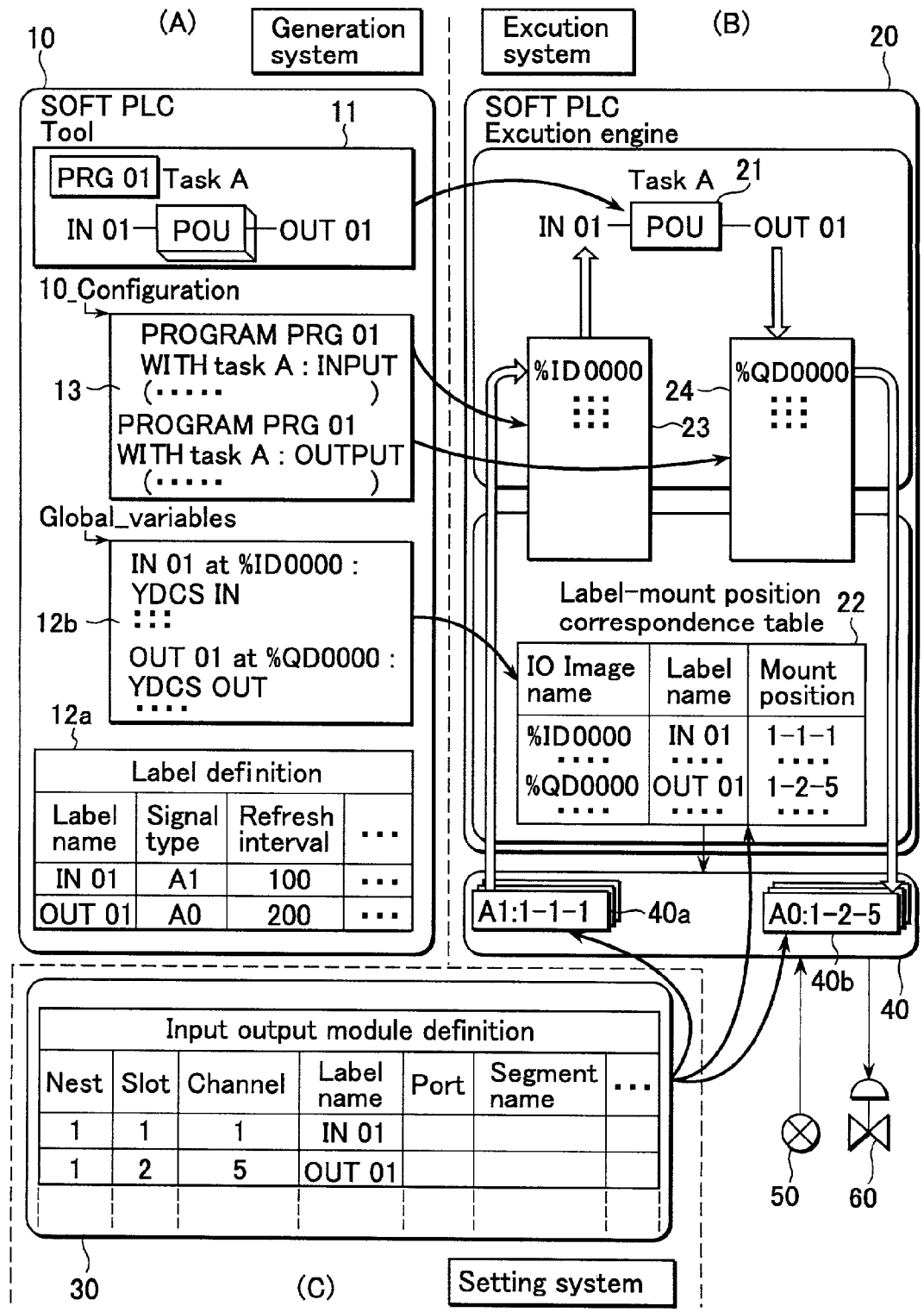
FIG. 5 is an illustration of an application example of the present invention.

Next, an application example of the device of the present invention will be described in further detail using FIG. 5. The area (A) delineated by the broken lines is the soft PLC generation system, and corresponds to the control logic generating unit 10 in FIG. 4. The area (B) is an execution system which corresponds to the control unit 20 and process input output unit 40 in FIG. 4. The area (C) is a setting system which corresponds to the table maintenance unit 30 in FIG. 4.

In the control logic generating unit 10, numeral 11 is a control logic (Task A) written by the soft PLC. The logic unit's POU (Program Organization Unit), input label name IN01, and output label name OUT01 are defined and downloaded as a soft PLC execution engine 21 of the control unit 20 in the execution system (B).

In the control unit 20, data buffer memories 23 and 24 are areas provided to the input label name IN01 and output label name OUT01. IO image names % ID0000 and % QD0000 denote data buffer areas to input label name IN01 and output label name OUT01.

In the generation system's control logic generating unit 10, a program 12b defines global variables based on the table information of a label definition table 12a. The label definition table 12a and program 12b are downloaded to the label-mount position correspondence table 22 of the control unit 20.

In addition, a program 13 defines the IO image of the aforementioned data buffer memories 23 and 24 in the control unit 20, and is downloaded to the control unit 20.

In the table maintenance unit 30 in the setting system, the real process' I/O data to be connected to input label name IN01 and output label name OUT01 are defined. These_data are downloaded to the aforementioned correspondence table 22, and to an input data module group 40*a* and output data module group 40*b* in the process input output unit 40.

These module groups 40*a* and 40*b* are uniquely defined in a one-to-one manner with the mount positions for each label name, so the control application execution means can communicate with any I/O data based on a label name setting and execute real process controls.

As is clear from the above description, with the present invention, label names are associated with each I/O point, and these labels are accessed from the control logic, making it possible to provide I/O hardware mounting information to areas outside the control logic.

Therefore, in cases where it is desired to change the mount position in the I/O data, it is sufficient to change the label name; changing the control logic (program) is unnecessary.

Because specific I/O mount information is not embedded in the control logic, the general applicability and the reusability of the control logic is improved, making it possible to flexibly adapt to changes in I/O mounting.

(Embodiment 4)

Figure 6:
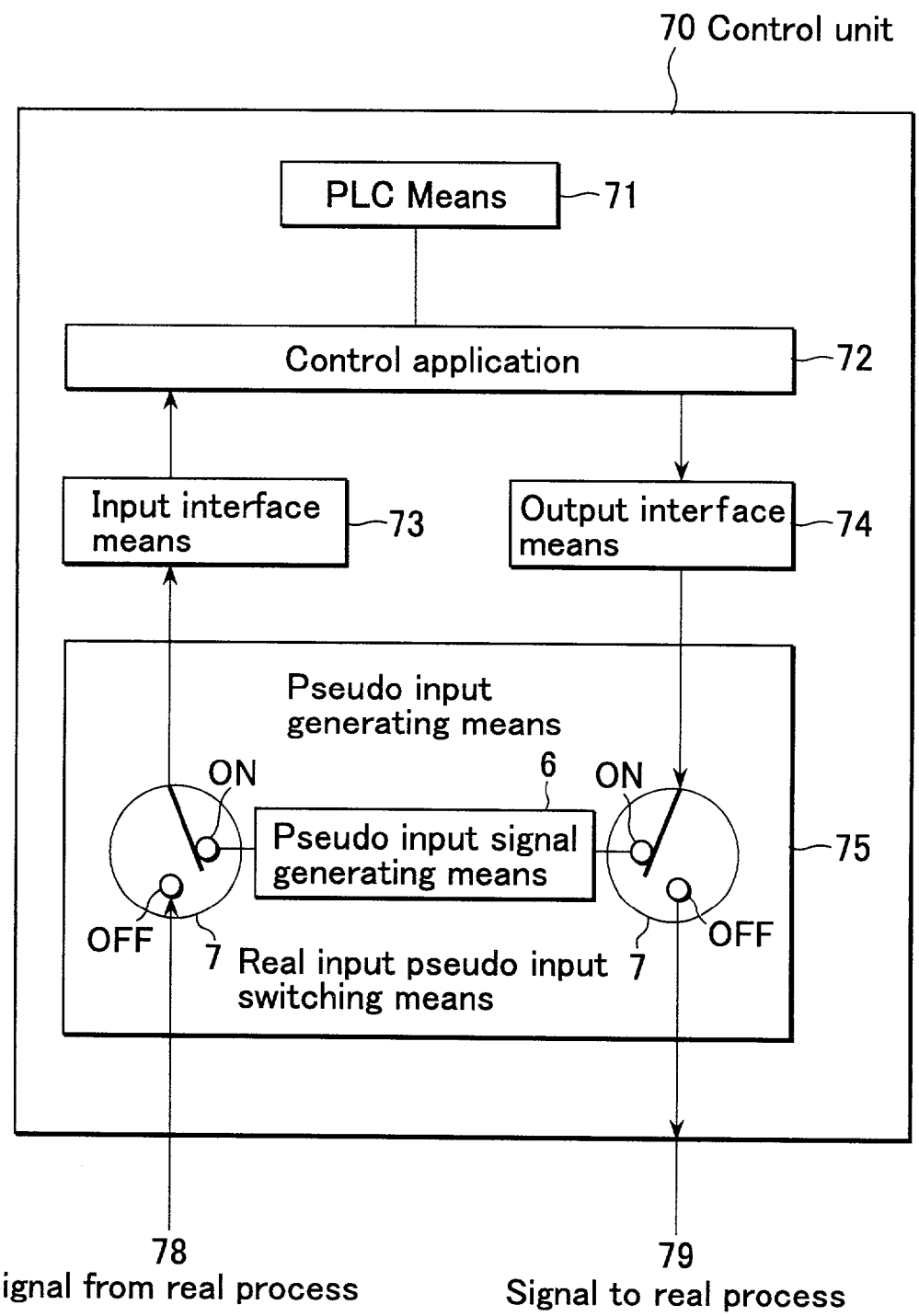
FIG. 6 is a function block diagram of Embodiment 4 of the present invention.

FIG. 6 is a function block diagram of Embodiment 4 of the present invention.

FIG. 6 is a diagram that illustrates an example configuration of a control unit in a process control system. FIG. 6 is a block diagram that illustrates a control unit in which are disposed an input generator and a PLC, which has functions defined in software and executes control applications.

A PLC means 71 operates inside the control unit 70. This PLC means 71 executes a control application 72. The control application 72 exchanges signals 78 and 79 with a real process via a dedicated input interface means 73 and output interface means 74.

A pseudo input generating means 75, which forms a characteristic part of the present invention, is comprised of a pseudo input signal generating means 76 and a real input pseudo input switching means 77. It forms part of the PLC means 71, wherein the functions are defined by software written in, for example, a programming language conforming to the IEC 61131-3 standard, in the same manner as the control application 72.

The pseudo input signal generating means 76 receives as input the output signal value on the output interface means 74, via the real input pseudo input switching means 77. It simulation-calculates the process response to said output signal and writes it to the input interface means 73 as a pseudo input signal. In addition, the pseudo input signal generating means 76 also has a function for calculating a pseudo input signal in an abnormal state.

When the pseudo input generating means 75 is functioning, the real input pseudo input switching means 77 stops the operation of updating the input interface means 73 with the signal 78 from the real process, and the operation of updating the real process with the signal 79 from the output interface means 74.

Figure 7:
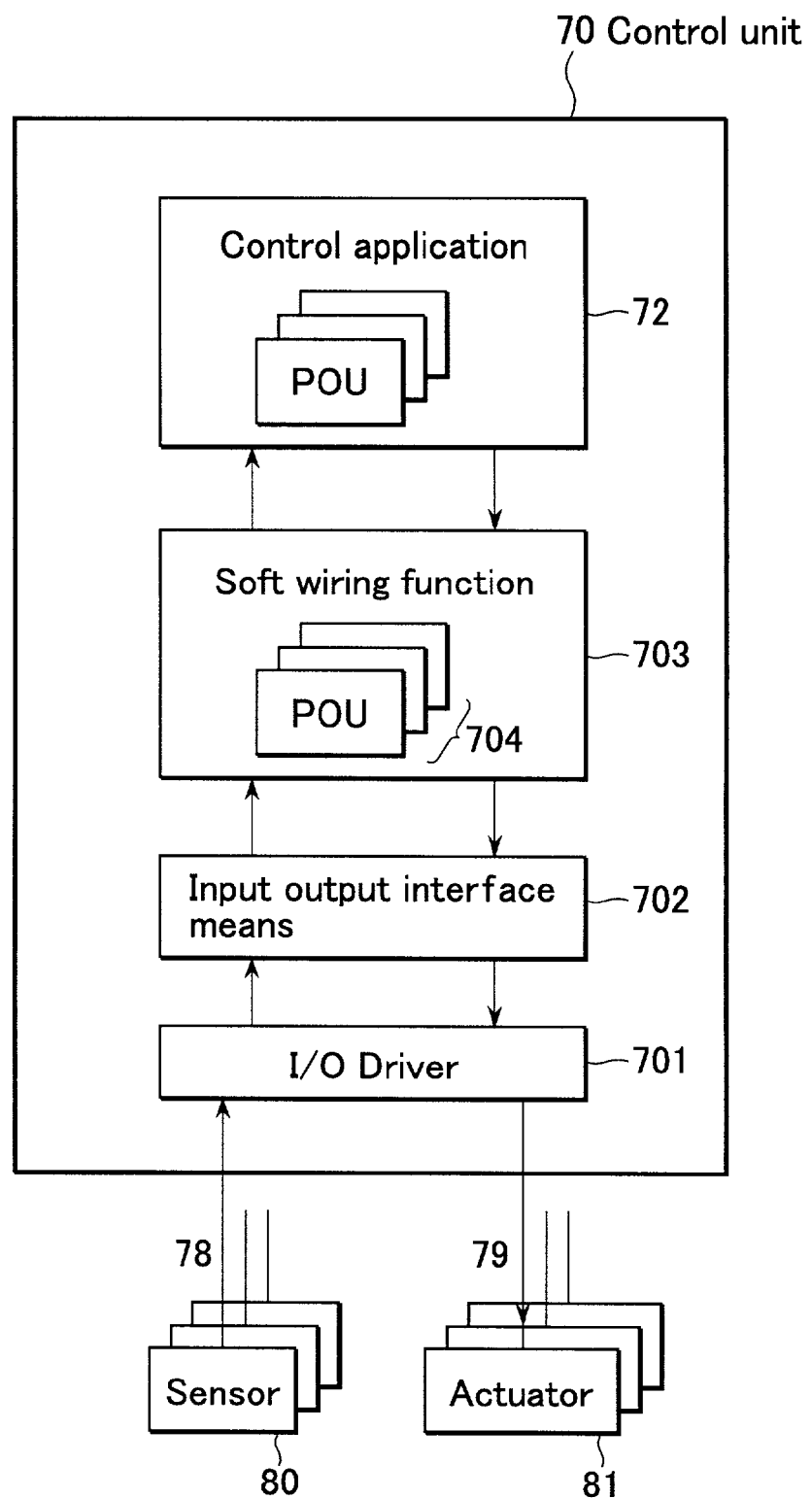
FIG. 7 is an embodiment of a process control system using the control unit in FIG. 6.

FIG. 7 is an embodiment of a process control system that uses the control unit in FIG. 6. In this example, an I/O driver 701 inside the control unit 70 directly handles the measurement signal 78 from a sensor 80, and an actuator signal 79 for an actuator 81. The I/O driver 701 exchanges these signals with the control application 72 via an input output interface means 702.

Normally, the control application 72 references the input signal variable updated by the I/O driver 701, and a group of POUs (Program Organization Units) forming the control application 72 uses these values for control computations.

The computation results are written to the input output interface means 702, and the I/O driver 701 transmits this information to the actuator 81.

A soft wiring function 703 is inserted between the control application 72 and input output interface means 702. Like the control application 72, it is formed from multiple POUs 704. This soft wiring function contains the real input pseudo input switching means described with respect to FIG. 6.

The group of POUs 704 forming the soft wiring function 703 reads the output signal variable values which are the computation results of the control application 72; performs computations upon them, such as gain, bias, and dead time; and calculates the pseudo response of the process input with respect to the process output.

This pseudo response is written to an input signal variable, so if the user switches the soft wiring function to the usage state, the control application 72 can use this pseudo response to perform control computations.

While the soft wiring function 703 is operating, updating of the I/O signal variables by the I/O driver 701 is halted. Therefore, the detection results of the sensor 80 are not reflected in the input signal variables, and the computation results are not transmitted to the actuator 81.

The group of POUs 704 forming the soft wiring function 703 is provided in multiple types according to the input signal and output types, as well as the pseudo response calculation algorithm. The user can select an appropriate POU according to the application and debug the control application 72.

In cases where the functions of the group of POUs 704 are written in a standard-type language of the IEC 61131-3 standard, variations can be easily increased. Therefore, when the number of I/O signal types is increased, or when a new pseudo response calculation algorithm is to be introduced, flexible adaptation is possible.

The base of the soft wiring function 703 is comprised of the group of POUs 704, so it may be handled at exactly the same level as general control applications. Therefore, in cases where the control application 72 and soft wiring function 703 conform to the IEC 61131-3 standard, debugging is possible in all platforms on which an application can be executed. This means that this soft wiring function functions on all control units conforming to the IEC 61131-3 standard, as well as simulators thereof.

Next, applications of the present invention to plant training systems will be discussed.

The present invention can be applied to plant training systems by increasing the sophistication and complexity of the computations of the group of POUs 704 performing the soft wiring operations.

In this case, computations that model the controlled plant are written in the IEC 61131-3 standard-based language, and are implemented as the group of POUs 704.

This group of POUs supplies the control application 72 with a computation output based on the model of the plant, as a pseudo input. Therefore, the control unit 70 performs computations equivalent to the operating state of the real plant, making it possible to easily build a system for training plant operators.

As described above, the soft wiring function 703 can operate on all platforms conforming to the IEC 61131-3 standard, so a plant training system can be built with no distinction among control unit vendors or distinction between the real equipment and simulator.

Pseudo inputs can be created freely, so it is easy to replicate an abnormal state. Therefore, the plant training system can also easily provide the most important training, which is training for abnormal occurrences.

In addition, in a highly distributed environment proposed in IEC61499 and the like, a group of POUs realizing these plant models can also be arranged on platforms (e.g., high-performance PCs) with extra capabilities and resources, instead of control units with limited processing capabilities and resources. In such cases, it is possible to perform modeling computations with even greater complexity and accuracy.

As is clear from the above description, with the present invention, signals from an input unit are simulated by software, making it possible to provide an effective debugging environment.

Furthermore, in cases where the control application and soft wiring function are written in, for example, a standard-type programming language conforming to the IEC 61131-3 standard, an extremely flexible debugging environment and plant training environment can be easily realized.

What is claimed is:

1. A process control system, comprising:
   a control unit that executes control computations using a normalized signal as an input value and outputs an operation value; and
   a monitoring unit that communicates with the control unit via a control bus, and converts the operation value output from the control unit to a physical unit value scale and displays the operation value;
   wherein the control unit includes an input data storage means for associating and storing the input value and engineering unit value scale data as structuralized data, and an operation means for receiving the structuralized data from the input data storage means and computing the operation value;
   wherein the operation means supplies the operation value and the engineering unit value scale data to a display means of the monitoring unit.

2. The process control system of claim 1, wherein the control unit further comprises a database and an initialization means, and wherein the engineering unit value scale data are read from the database, and are set by the initialization means in the input data storage means.

3. The process control system of claim 1, further comprising an input unit,
   wherein the engineering unit value scale data are supplied, together with the input value, to the control unit via the input unit, and set in the input data storage means.

4. A process control system, comprising:
   I/O modules corresponding to I/O points, the I/O modules inputting and outputting I/O data;
   an input output unit that directs the I/O data passing through the I/O modules;
   control logic to receive the I/O data passing through the I/O modules and to handle the I/O data;
   a label definition means for defining variables handled by the control logic using label names; and
   a correspondence table, which provides correspondences between mount positions specifying the I/O modules, and the label names;
   wherein the data input and output from the I/O modules are connected to corresponding control logic based on the correspondence table.

5. The process control system of claim 4, wherein the control logic is built using a soft PLC the functions of which are defined by software, which soft PLC is written in a programming language conforming to the IEC 61131-3 standard.

6. A process control system comprising:
   a control logic generating unit comprising a control logic generating means that creates control logic used by a control application, and a label definition means that defines variables handled by the control logic using label names;
   a control unit comprising a control application execution means, which is generated by downloading data of the control logic generation means, and a correspondence table,
   which is generated by downloading data of the label definition means, and which provides correspondences between mount positions specifying I/O modules, and the label names;
   a table maintenance unit that maintains the correspondences between the label names and the mount positions in the correspondence table; and
   a process input output unit comprising input and output modules for inputting and outputting data;
   wherein the data input and output from the process input output unit are connected to corresponding control logic based on the correspondence table.

7. The process control system as recited in claim 6, wherein the control logic generating unit, control unit, table maintenance unit, and process input output unit are written in a programming language conforming to the IEC 61131-3 standard.

8. A process control system comprising;
   a PLC means, whose functions are defined by software and which executes a control application;
   an input interface means that interfaces a signal from a real process to the PLC means;
   an output interface means that interfaces a signal from the PLC means to a real process;
   a pseudo input generating means, whose functions are defined by software and which generates a simulated input signal based on a signal from the output interface means; and
   a real input pseudo input switching means, which, when a simulated input signal is used, supplies the pseudo input generating means with a signal from the output interface means, and supplies the input interface means with the output signal of the pseudo input generating means.

9. The process control system of claim 8, wherein the PLC means and pseudo input generating means are written in a programming language conforming to the IEC 61131-3 standard.

10. The process control system of claim 8 or 9, wherein the pseudo input generating means simulation-calculates a response of a process according to a signal from the output interface means.

11. The process control system in claim 8 or 9, wherein the pseudo input generating means simulation-calculates an abnormal state of a process according to a signal from the output interface means.

12. The process control system in claim 8 or 9, wherein the real input pseudo input switching means comprises a soft wiring means.

* * * * *